United States Patent
Matsuo

(10) Patent No.: US 6,374,246 B1
(45) Date of Patent: Apr. 16, 2002

(54) MESSAGE SERVICE SYSTEM THAT PROVIDES FLEXIBLE ROUTE CONTROL AND USER INTERFACE ADAPTION

(75) Inventor: Takashi Matsuo, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/141,302

(22) Filed: Aug. 27, 1998

(30) Foreign Application Priority Data

Aug. 27, 1997 (JP) ............................................. 9-230595

(51) Int. Cl.⁷ .............................................. G06F 17/30
(52) U.S. Cl. ............................ 707/10; 707/1; 707/102; 709/206; 709/207; 709/218; 709/219
(58) Field of Search ............................ 707/10, 102, 1; 709/303, 245, 233, 206, 207, 219, 246, 218; 358/402; 379/93.24, 100.08

(56) References Cited

U.S. PATENT DOCUMENTS

| | | | |
|---|---|---|---|
| 5,140,419 A | | 8/1992 | Galumbeck et al. ........ 358/142 |
| 5,530,848 A | * | 6/1996 | Gilbert et al. ............... 709/303 |
| 5,694,616 A | * | 12/1997 | Johnson et al. ............. 709/207 |
| 5,739,512 A | * | 4/1998 | Tognazzini .................. 325/380 |
| 5,752,059 A | * | 5/1998 | Holleran et al. ............ 709/245 |
| 5,859,967 A | * | 1/1999 | Kaufeld et al. ............. 713/200 |
| 5,881,233 A | * | 3/1999 | Toyoda et al. .............. 709/233 |
| 5,923,845 A | * | 7/1999 | Kamiya et al. ........... 379/93.15 |
| 5,923,848 A | * | 7/1999 | Goodhand et al. .......... 709/219 |
| 5,978,836 A | * | 11/1999 | Ouchi ........................ 709/206 |
| 6,003,070 A | * | 12/1999 | Frantz ........................ 709/206 |
| 6,023,345 A | * | 2/2000 | Bloomfield ................. 358/402 |
| 6,161,008 A | * | 12/2000 | Lee et al. ................... 455/414 |

FOREIGN PATENT DOCUMENTS

| | | |
|---|---|---|
| JP | 2-281847 | 11/1990 |
| JP | 7-131481 | 5/1995 |
| JP | 7-311668 | 11/1995 |
| JP | 8-56263 | 2/1996 |

OTHER PUBLICATIONS

Niebert et al. "Service control in PSCS", IEEE, vo.135, pp. 157–164, Sep. 28, 1995.*
Lu Cary, "Calling all messages", Boston, Inc; V.17 No.. 9, pp. 31, Jan. 1995.*

* cited by examiner

Primary Examiner—Jean M. Corrielus
(74) Attorney, Agent, or Firm—Israel Gopstein

(57) ABSTRACT

A message transfer service system comprising a data base for managing an address record for each user, message servers and clients served by the servers. Address data with which a recipient can be identified is used as a destination address. If there is only one address in an address record of the recipient, a message is sent to the address. If the address record contains a plurality of addresses, the addresses are sorted in order of priority based on destination specifying information, which may be registered in the address record by the recipient or specified by the sender. In this case, the message is sent to the highest-priority address. The format of message is converted according to the kind of terminal identified by the highest-priority address, if necessary. The server can execute a script received with a message. The server can generate a user interface by using interface components stored therein on the basis of application setting information.

11 Claims, 8 Drawing Sheets

| NAME | TELEPHONE | FACSIMILE | E-MAIL | TERMINAL | FORMAT |
|---|---|---|---|---|---|
| Takashi Matsuo | 03-1111-2222<br>010-111-3333 | 03-1111-2223 | matsuo@msrl.mei.co.jp<br>matsu@pino.net | [pc]PanaXXXX<br>[mobile]Pinocchio | UUDECODE |
| . | . | . | . | . | . |
| . | . | . | . | . | . |

| RECEPTION SCRIPT | LOGIN NAME | APPLICATION SETING INFO | · · · |
|---|---|---|---|
| [time:0:00-7:00] Fax03-1111-2223<br>[from:mitoh]Celluler010-111-3333<br>[terminal:mobile]Mailmatsu@pino.net<br>[otherwise]Mailmatsuo@msrl.mei.co.jp | xxxxx | | · · · |
| . | | | · · · |

| NAME | TELEPHONE | FACSIMILE | E-MAIL | TERMINAL | FORMAT |
|---|---|---|---|---|---|
| Takashi Matsuo | 03-1111-2222<br>010-111-3333 | 03-1111-2223 | matsuo@msrl.mei.co.jp | [pc]PanaXXXX | UUDECODE |
| ... | ... | ... | ... | ... | ... |

FIG. 5

| NAME | TELEPHONE | FACSIMILE | E-MAIL | TERMINAL | FORMAT |
|---|---|---|---|---|---|
| Takashi Matsuo | 03-1111-2222<br>010-111-3333 | 03-1111-2223 | matsuo@msrl.mei.co.jp<br>matsu@pino.net | [pc]PanaXXXX<br>[mobile]Pinocchio | UUDECODE |
| ... | ... | ... | ... | ... | ... |

| RECEPTION SCRIPT | LOGIN NAME | APPLICATION SETING INFO |
|---|---|---|
| [time:0:00-7:00] Fax03-1111-2223<br>[from:mitoh]Celluler010-111-3333<br>[terminal:mobile]Mailmatsu@pino.net<br>[otherwise]Mailmatsuo@msrl.mei.co.jp | xxxxx | |
| ... | | |

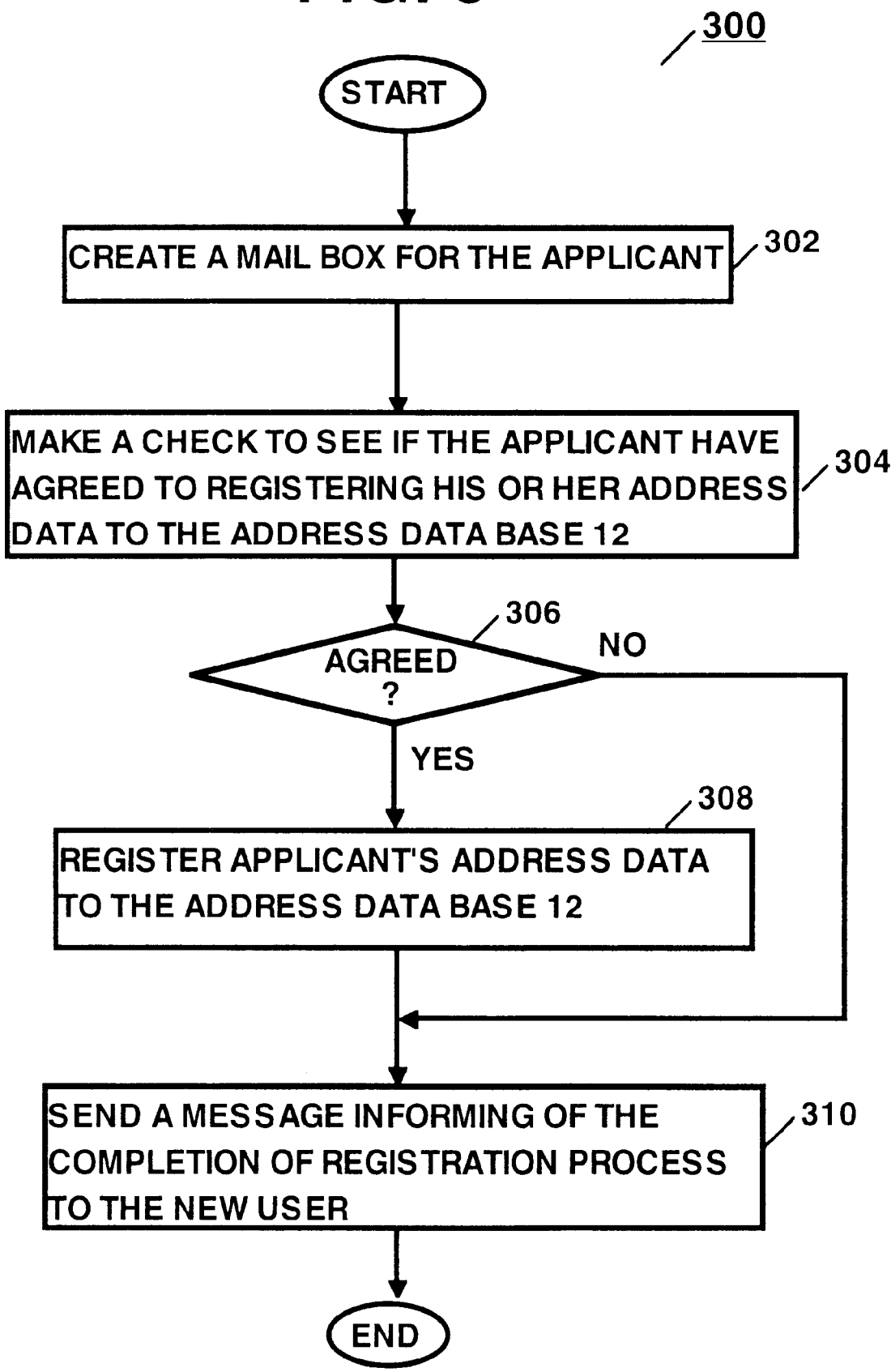

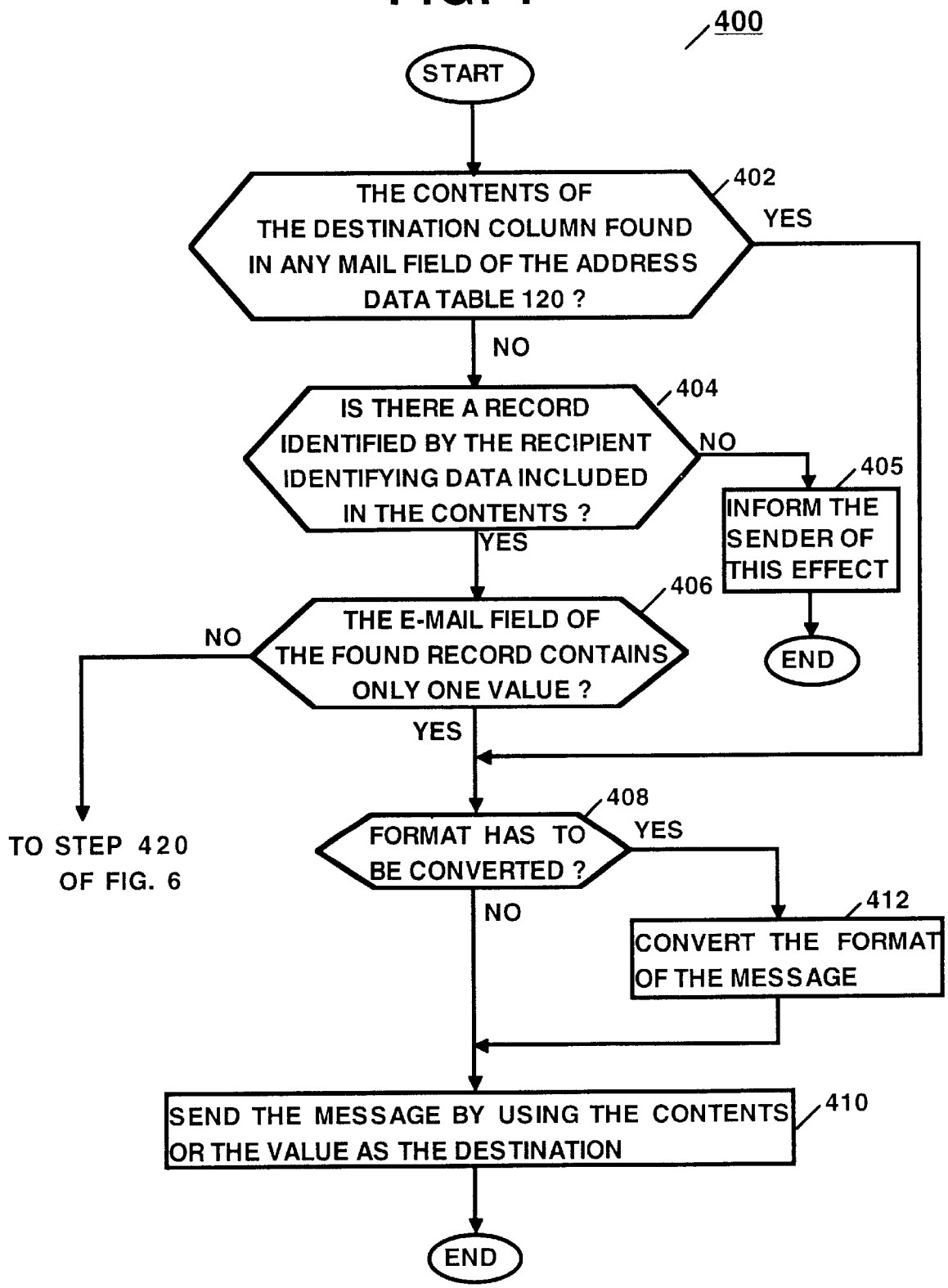

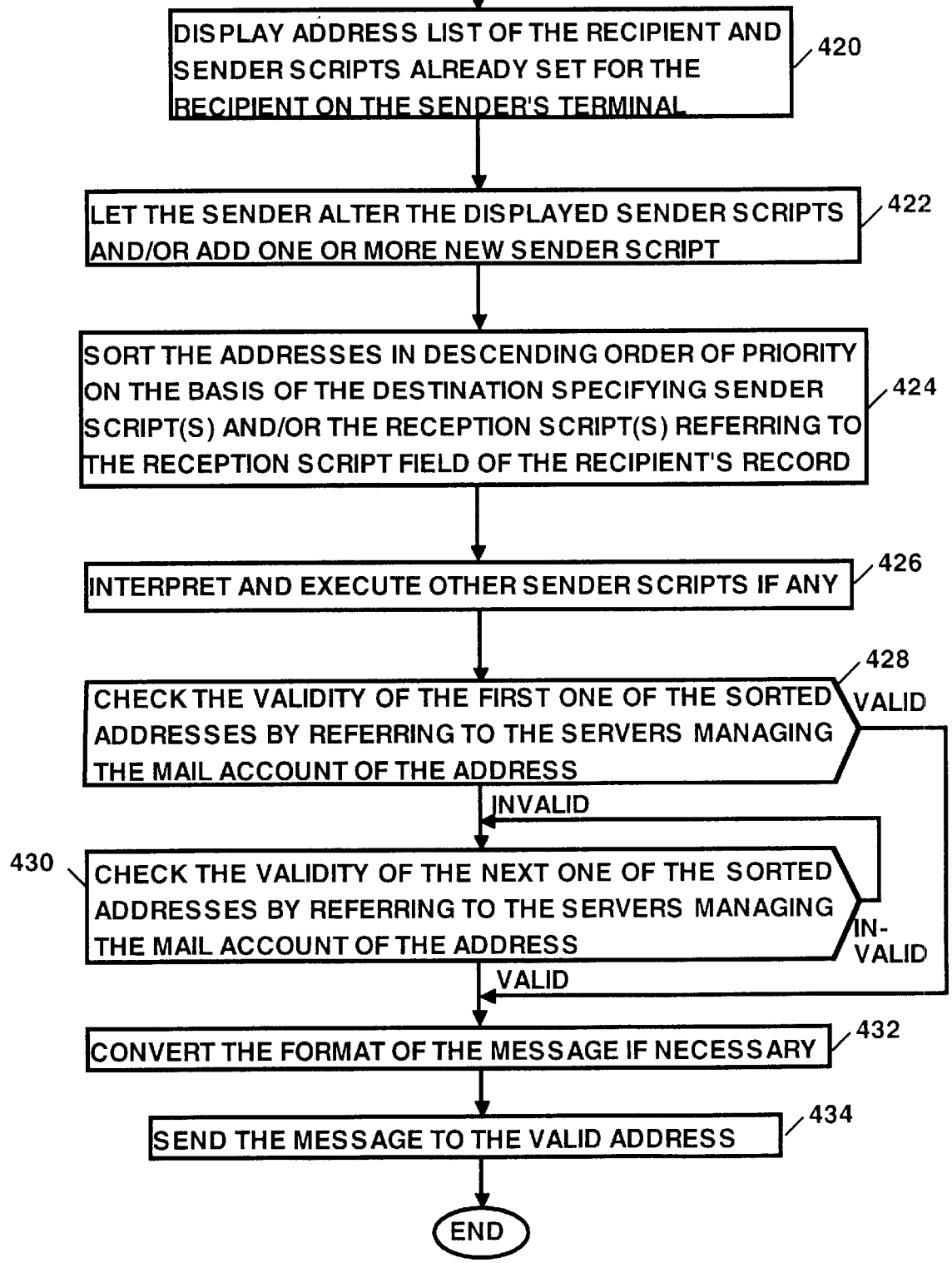

RECIPIENT: Takashi Matsuo

| RECIPIENT'S ADDRESSES | |
|---|---|
| Tel-1 | 03-1111-2222 |
| Tel-2 | 010-111-3333 |
| Fax | 03-1111-2223 |
| Mail-1 | matsuo@msrl.mei.co.jp |
| Mail-2 | matsu@pinonet |

DESTINATION SPECIFYING SCRIPTS

[TIME: 0:00-7:00] Mail-1
[terminal: mobile] Mail-2
[otherwise] Mail-1

MESSAGE:
Hallow! How are you?

MESSAGE SERVICE SYSTEM THAT PROVIDES FLEXIBLE ROUTE CONTROL AND USER INTERFACE ADAPTION

BACKGROUND OF THE INVENTION

1. Field of the Invention

The invention relates to a message server system which utilizing a directory information base to enhance the convenience of users.

The message in this case includes electronic mails input from terminals such as computers, facsimile data input from facsimile terminal, speech data input from telephone terminals, etc. A message server system includes one or more message server(s) which controls and transfers a message between terminals, connected by lines or radio to various networks, such as telephones, mobile telephones, facsimile machines, pagers, various computers, etc.

2. Description of the Prior Art

In a conventional electronic mail (or e-mail) system, which provides asynchronous communications, if a sender sends an e-mail message to the recipient by specifying the recipient's e-mail address, then the message is transmitted over communication networks to the e-mail server which serves the recipient and is identified by the server address part (which follows the character "@") of the recipient's e-mail address. The e-mail server stores the message in the electronic mailbox identified by the user ID part of the recipient's e-mail address which part precedes the character "@".

The present invention relates to a system and method for determining a message transmission destination in such message server system. Various such systems and methods have been proposed so far.

Japanese unexamined patent application publication No. Hei2-281,847 (1990) discloses an "ELECTRONIC MAIL TRANSMISSION SYSTEM". In the system, if an e-mail destination for any recipient is input, the full name of the recipient and the related destinations which are stored in a data-base are displayed. Selection by the sender of a desired destination results in an e-mail transmission to the selected destination.

Japanese unexamined patent application publication No. Hei7-131,481 (1995) discloses a "DETERMINING METHOD FOR DISTRIBUTION OF ELECTRONIC MAIL". In the method, the sender is permitted to send a message by specifying the name of the recipient. If a plurality of mail addresses are registered in the entry of a directory information base which is identified by the recipient's name, the message is transmitted to a mail address specified by address specifying information preset by the recipient.

Japanese unexamined patent application publication No. Hei8-56,263 (1996) discloses a "PERSONAL COMMUNICATION SERVICE DISTRIBUTION CONTROL SYSTEM". The system integrates different kinds of networks (which use different communication procedures and different ID's to permit each user to utilize a personal communication service without paying any attention to the kind of terminal of the recipient by using a personal ID of the recipient which is available in any of the networks.

However, the above-mentioned prior art references have problems of (i) lacking flexibility in the way of specifying a recipient, (ii) having no means for deciding to which e-mail address or terminal a message should be sent if the recipient has a plurality of e-mail addresses or communication terminals, and (iii) having no means for deciding in what form a message should be sent because of inability of knowing functions and the user interface the recipient's terminal is provided with.

It is therefore an object of the invention to provide an electronic mail system which provides enhanced convenience for users by having a directory information base.

SUMMARY OF THE INVENTION

According to the invention, a message transfer service system comprises a data base for managing an address record for each user, message servers and clients served by the servers. Address data with which a recipient can be identified is used as a destination address. If there is only one address in an address record of the recipient, a message is sent to the address.

If the address record contains a plurality of addresses, the addresses are sorted in order of priority based on destination specifying information, which may be registered in the address record by the recipient or specified by the sender. In this case, the message is sent to the highest-priority address. The format of message is converted according to the kind of terminal identified by the highest-priority address, if necessary. The server can execute a script received with a message.

The server can generate a user interface by using interface components stored therein on the basis of application setting information stored in the data base.

BRIEF DESCRIPTION OF THE DRAWING

Further objects and advantages of the present invention will be apparent from the following description of the preferred embodiments of the invention as illustrated in the accompanying drawing, in which:

FIG. 2 is a diagram showing an exemplary structure of each of the records (or the entries) of the address data base 12 and an example of an address data record;

FIG. 3 is a flow chart showing a registration operation executed by the CPU (not shown) of the message server 20 under the control of an e-mail account opening routine 300 of the mail processor 22;

FIG. 4 is a flow chart showing a message transfer operation 400 executed by the CPU (not shown) of the message server 20 under the control of the mail processor 22;

FIG. 5 is a diagram showing an exemplary record of a registered user who has a plurality of e-mail and other addresses;

FIG. 6 is a flow chart showing a part of the message transfer operation 400 executed when the recipient has a plurality of e-mail and other addresses;

Throughout the drawing, the same elements when shown in more than one figure are designated by the same reference numerals.

DETAILED DESCRIPTION OF THE PREFERRED EMBODIMENTS

Figure 1:
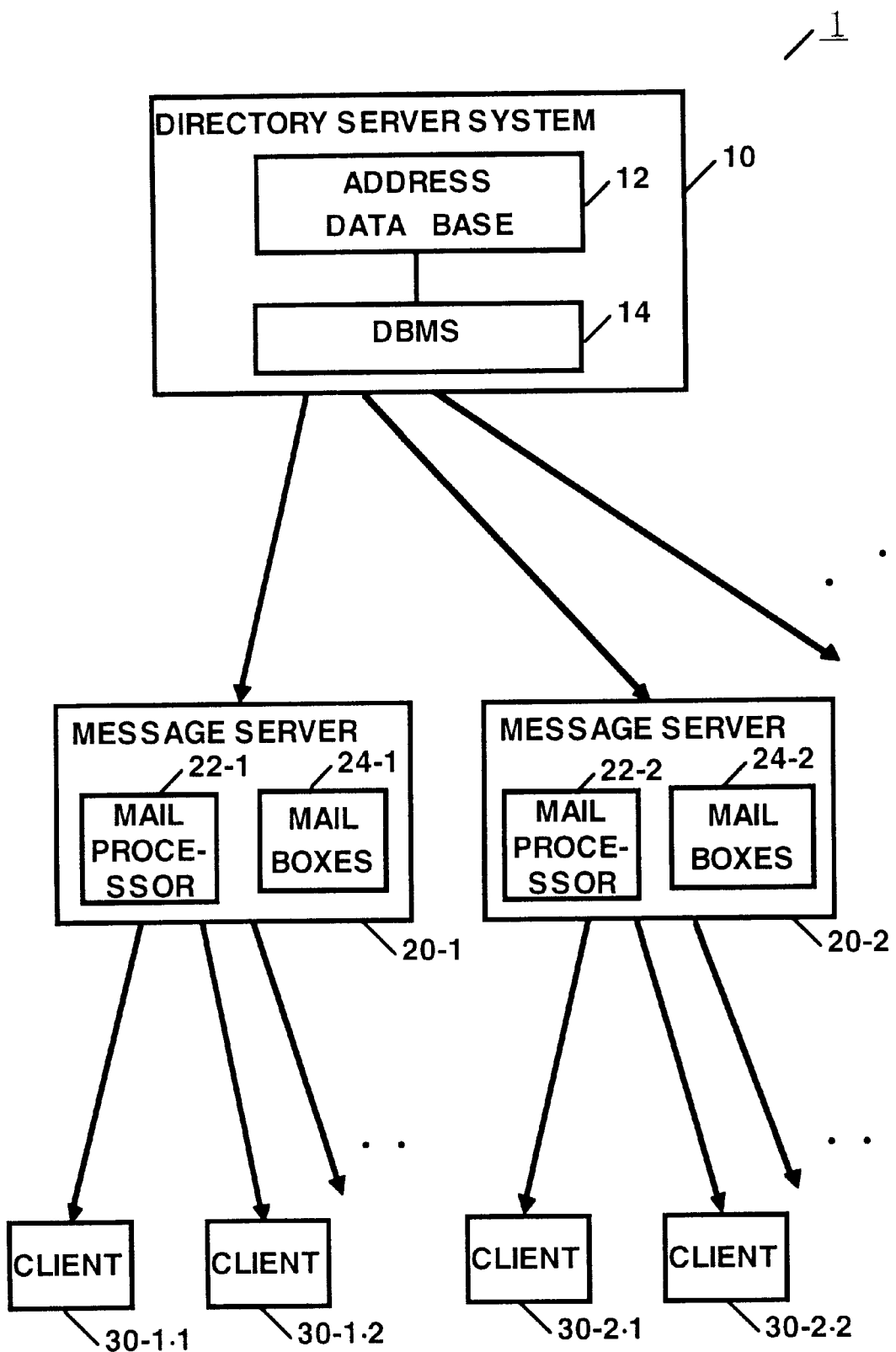
FIG. 1 is a schematic block diagram showing an overall arrangement of a message server system in accordance with an illustrative embodiment of the invention.

FIG. 1 is a schematic block diagram showing an overall arrangement of a message server system 1 in accordance with an illustrative embodiment of the invention. In FIG. 1, the message server system 1 comprises a directory server system 10, at least one message server 20-1, 20-2, . . . (hereinafter referred to en bloc as "message servers 20") connected with the directory server 10 via any communication line(s), and a multiplicity of clients 30-1·1, 30-1·2, . . . , 30-2·1, 30-2·2, . . . . connected with respective message servers 20 via any communication lines. The directory server system 10 and the message servers 20 comprise any suitable computers viewed in terms of hardware.

The directory server system 10, which is a kind of data base system, manages address data of users of the message server system 1, i.e., performs a registration, an alteration, a deletion and a retrieval of address data of a user in response to a request from each client 30-i·j (i=1, 2, . . . . and j=1, 2, . . . . The directory server system 10 preferably comprises an address data base 12 and a data base management system (DBMS) 14. The address data base 12 preferably contains address data of as many e-mail users as possible. That is, the message server system 1 preferably incorporates as many e-mail servers (or message servers) as possible as the message servers 20. Ideally, all of the e-mail servers in a whole country or the world should be incorporated in the message server system 1. For the sake of the simplicity of the description, it is assumed that the message servers 20 comprise e-mail servers in a country, say, in Japan.

FIG. 2 is a diagram showing an exemplary structure of each of the records (or the entries) of an address data table 120 of the address data base 12 and an example of an address data record of Mr. Takashi Matsuo. The address data table 120 contains a unique record for each of the users who has agreed to register his address data to the address data base 12 when he or she opened his or her first account in some message server 20-i (hereinafter referred to as a "registered user"). In FIG.2, each record comprises fields (or attributes) of NAME which contains the name of the user, TELEPHONE for telephone number(s), FACSIMILE for facsimile number(s), E-MAIL for e-mail address(es), TERMINAL, etc. It is noted that though fields other than the name field are shown in FIG. 2 as capable of contaings more than one value, instead of doing so, some fields that each permit only one value may be provided for each attribute.

Each (20-i) of the message servers 20 comprises a mail service program (or mail processor) 22 and mail boxes 24 for users who have accounts with the message server 20-i. Each mail processor 22-i provides, to the users who have mail accounts with the message server 20-i, e-mail reception services in a conventional manner and e-mail transmission services in accordance with the principles of the invention as detailed later. Each of the users who have mail accounts with the message server 20-i is given a mail box 24-i for temporarily storing received mail messages addressed to the user.

The clients 30 may be any computers (including personal computers) on which some e-mail user agent is available. The user agent is a software for permitting the user to create, send and receive an e-mail message.

The directory server system 10 and each of the message servers 20 are typically connected with each other via a public communication line. The connections between a message server 20-i and the clients 30 may be achieved via various communication paths including wireless communication paths. The operation of the e-mail system 1 of FIG. 1 will be described in detail in the following.

Registering Address Data to the Address Data Base 12

FIG. 3 is a flow chart showing a registration operation executed by the CPU (not shown) of the message server 20-i under the control of an e-mail account opening routine 300 of the mail processor 22-i. If an applicant sends a filled-in application form to a message server 20-i on line, the CPU (not shown) of the server 20-i enters the e-mail account opening routine 300 of FIG. 3. In step 302, the CPU creates a mail box 24-i in the name of the applicant. In step 304, the CPU makes a check to see if the applicant has agreed (in the application form) to registering his or her address data to the address data base 12. For this purpose, it is preferable to include a question of whether the applicant agrees to do so in the application form. If the applicant has agreed in step 306, then the CPU sends a registration request with applicant's address data to the directory server system 10 in step 308. If the applicant has not agreed in step 306 or if the CPU ends step 308, the CPU sends a message informing of the completion of registration process to the new user (or the applicant) in step 310. Then, the CPU ends the operation of the e-mail account opening routine 300.

Address data registered in the registration process include the name of the applicant, phone number(s), facsimile number(s), user ID portion of e-mail address and a password for the account. In case of off-line application, "the CPU" should be read as the administrator of the message server 20-i in the above description. A user whose address data has been registered in the address data base 12 is called a registered user. Sending a message to a registered user According to the principles of the invention, the user is permitted to address a message to a recipient by specifying a combination of a recipient identifying part and the server address part (which follows the character "@") of the recipient's e-mail address. The recipient identifying part is expressed by prefixing a predetermined string indicative of the field containing the recipient identifying data to the recipient identifying data. For example, a phone number or a facsimile number is available as the recipient identifying data. If a message is to be sent to the e-mail address "matsuo@msrl.mei.co.jp" of Mr. Matsuo shown in FIG. 2, the e-mail address column in an e-mail entry form may be filled up in any of the following ways:

matsuo@msrl.mei.co.jp

TEL03-1111-2222@msrl.mei.co.jp,

TEL010-111-3333@msrl.mei.co.jp, or

FAX03-1111-2223@msrl.mei.co.jp.

If other family member(s) of Mr. Matsuo is (are) also a registered user of the message server system 1, this scheme is not available. For this purpose, it is also permitted to specify the destination as "TEL03-1111-2222, NAMETakashi@msrl.mei.co.jp". This feature gives flexibility to the way of specifying the destination address.

According to the principles of the invention, the user can register the kind of terminal he or she usually uses for the registered mail account (TERMINAL field) and an available format usable in the terminal (FORMAT field) as shown in FIG. 2. For example, Matsuo uses a mail account "matsuo@msrl.mei.co.jp" through a PC (personal computer) called "PanaXXXX" as seen from FIG. 2. Also, the well known UUDECODE is available on PanaXXXX. Accordingly, if a user sends a message of the well-known MIME (Multipurpose Internet Mail Extensions) format from a certain client terminal, say, 30-1·1 to the address "matsuo@msrl.mei.co.jp", then the message server 20-1 serving the client 30-1·1 has to decode the message and UUENCODEs the decoded massage before transferring the message to the message server 20-i serving the Matsuo's terminal 30-i·j. Doing this permit terminal which uses a conventional mailing tool to communicate with other terminals on which only formats different from that of the conventional mailing tool are available.

FIG. 4 is a flow chart showing a message transfer operation 400 executed by the CPU (not shown) of the message server 20 under the control of the mail processor 22. When a user issues a message sending command after entering a message at some client, e.g., 30-1·1, then the CPU enters a message transfer operation 400 of FIG. 4. It is assumed that the user has filled in "TEL03-1111-2222@msrl.mei.co.jp" in a destination column (not shown) of a message entry form (not shown) displayed by the mailing tool executed on the client 30-1·1. Then, the CPU makes a test, in step 402, to see if the contents of the destination column is found in any E-MAIL field of the address data table 120, which means that the contents is the e-mail address of the recipient. If so, then the CPU makes a decision, in decision step 408, on whether the message needs a format conversion by comparing the format of the message with the value of the FORMAT field of the found record. If so, the CPU converts the format of the message into the format specified in the FORMAT field in step 412. Otherwise or if the CPU completes step 412, the CPU sends the message to the e-mail address specified by the contents of the destination column in step 410. Then, the CPU ends the message transfer operation 400.

If the test result is NO in decision step 402, then the CPU searches, in step 404, the TELEPHONE fields of the address data table 120 for 03-1111-2222 (in this example) because the recipient identifying part of the destination column is "TEL03-1111-2222" as assumed above. The CPU finds a record of Takashi Matsuo in this example. If the CPU can not find a record containing the recipient identifying data in step 404, the CPU informs the sender of this effect in step 405 by sending an e-mail to the sender or by displaying playing a message to this effect on the client terminal (30-1·1 in this example) of the sender if the client 30-1·1 uses a mailing tool adapted to the present invention. If the CPU finds the record in step 404, the CPU makes another test, in step 406, to see if the E-MAIL field of the found record contains only one value. If so, then the CPU proceeds to step 408, and thereafter operates as described above. Otherwise, the CPU performs a message transfer operation of the case where the recipient has a plurality of addresses.

It is noted that the above described aspects of the invention can be realized without imposing any restrictions on the clients 30 or mailing tools on the clients 30. The mailing tools and the protocols between the message servers 20 and the clients 30 may be any conventional ones such as ones according to ITU-T (International Telecommunication Union-telecommunication Sector) recommendations. However, in order to embody the following aspects of the invention, the clients 30 or mailing tools on the clients 30 are preferably adapted accordingly. In Case Where the Recipient Has a Plurality of Addresses If a registered recipient has a plurality of e-mail and other addresses as shown in FIG. 5, the addresses are sorted in descending order of priority on the basis of destination specifying sender script(s) written by the sender and/or reception script(s) registered by the recipient.

Figures 7, 8:
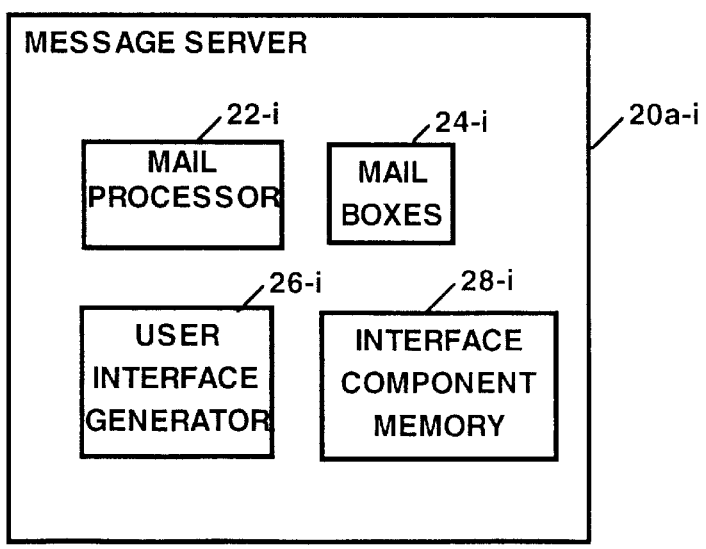
FIG. 7 is a diagram showing an exemplary frame displayed when the recipient has a plurality of e-mail and other addresses.
FIG. 8 is a diagram showing an arrangement of a message server 20a-i which can adapt the user interface in response to application setting information in accordance with the principles of the invention.

FIG. 6 is a flow chart showing a part of the message transfer operation 400 executed when the recipient has a plurality of e-mail and other addresses. If the test result is NO in decision step 406, the CPU displays a list of addresses the recipient has and destination specifying sender scripts already set for the recipient on the sender's terminal (as shown in FIG. 7) in step 420. Then, the CPU lets the sender alter the displayed sender scripts and/or add one or more new sender script in step 422.

According to present invention, a sender is permitted to write scripts (sender scripts) in sending a message. The sender scripts comprise destination specifying sender scripts which each associate a condition with an address and message altering scripts which alter the message contents. The destination specifying scripts may be either set for a recipient before sending a message or written when a specific message is sent. For example:

a script "[time:0:00–7:00] Fax03-1111-2223" is used if the sender desires to send a message to the facsimile number in the event it is from 0:00 to 7:00;

"[terminal:mobile]Mailmatsu@pino.net" is used if a message should be sent to the mail address in the event the sending terminal is mobile;

"[otherwise]Mailmatsu@msrl.mei.co.jp" is used as a last script meaning that a message should be sent to the address if any of the above stated conditions is the case, and so on.

In this way, an optimal destination address is adaptively selected in response to various conditions such as time, the kind of originating terminals. These sender scripts are interpreted and executed by the server 20.

In step 424, the CPU sorts the addresses in descending order of priority on the basis of the destination specifying sender script(s) and/or the reception script(s) referring to the RECEPTION SCRIPT field of the recipient's record in the address data table 120.

According to the principles of the invention, a registered user is permitted to register one or more reception script for specifying a destination address in response to a condition. Some examples of reception scripts are shown in the RECEPTION SCRIPT field in FIG. 5. A script "[from:mitoh]Cellular010-111-3333"

means that a message from "mitoh" should be sent to the cellular address. Another example of this kind of script is "[schedule] location", which means that the destination address should be determined by referring to a scheduler application as detailed later. The other scripts shown in FIG. 5 have been described above.

It should be noted that if a reception script conflicts with any sender script, the former is prior to the latter in the sorting of the addresses.

Returning to FIG. 6, the CPU interprets and executes other sender scripts if there are any sender scripts other than the destination specifying sender scripts in step 426. In step 428, the CPU checks the validity of the first one of the sorted addresses by referring to the servers managing the mail account of the address. If not, then the CPU checks the validity of the next one of the sorted addresses by referring to the servers managing the mail account of the address in step 420. This step is repeated till a valid address is found. If a first valid address is found, the CPU converts the format of the message if necessary in step 432. This step is equivalent to the combination of above described steps 408 and 412 of FIG. 4. Then, the CPU sends the message to the valid address in step 434, and ends the message transfer operation.

As seen from the above description, a message can be sent to any kind of terminals including a telephone, a facsimile, a mobile telephone, etc. by setting a destination specifying script. Further, the format of a message is automatically converted into one specified by the value of the TERMINAL field associated the e-mail address if the destination address is an e-mail address and in response to the kind of the destination terminal if the destination address is other than an e-mail one. Utilizing External Information for the Address Sorting External Information from the external may be used as a criterion for the address sorting. As external information, there are schedule data including the present position of the recipient which is obtained from a schedule management application, position information from a GPS (global positioning system) or a mobile telephone incorporating a GPS, etc. Also, the frequency of access to a message server having an e-mail account of the recipient may be used as a criterion for the address sorting.

If the RECEPTION SCRIPT field of the recipient's record contains the above-mentioned script "[schedule]location", then the CPU obtains the location information from the schedule management application the recipient is using, and, in step 424, gives the highest priority to the address which is associated with the obtained location information in the address data base 12. Alternatively, the schedule management application may supply location information to the message servers 20 at a predetermined interval. User Interface FIG. 8 is a diagram showing an arrangement of a message server 20a-i which can adapt the user interface in response to application setting information (or user interface attributes) in accordance with the principles of the invention. In FIG. 8 the message server 20a-i comprises the mail processor 22-i, the mail boxes 24-i, a user interface generator 26-i, and user interface parts 28-i used for user interface generation.

Figure 9:
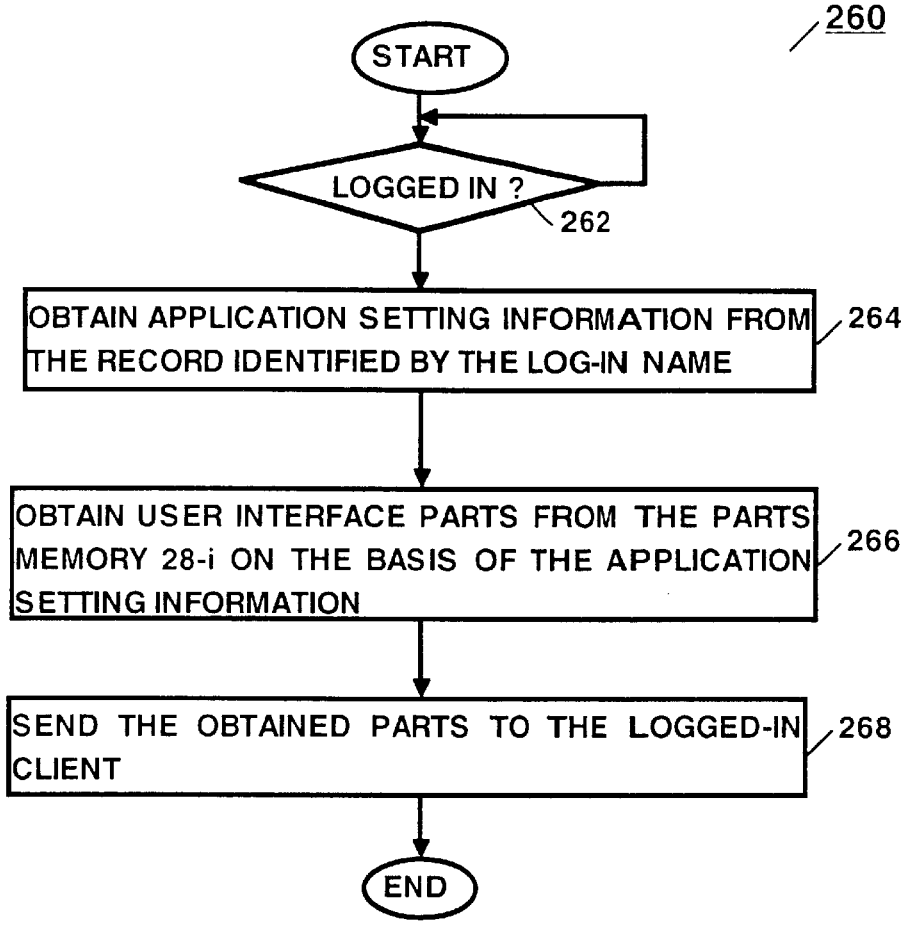
FIG. 9 is a flow chart showing a user interface generating operation in accordance with the invention.

FIG. 9 is a flow chart showing a user interface generating operation 260 executed by the CPU of a message server 20a-i under the control of the user interface generator 26-i in accordance with the invention. In FIG. 9, the CPU waits for a log-in in a client 30 in step 262. If a client is logged in a client 30, the CPU obtains application setting information from the record identified by the log-in name in step 264. The application setting information includes information on how displayed frames change in the user interface, information on input and output devices such as a keyboard, a pen, a mouse, a display, a loudspeaker, the degree of application understanding of the registered user, user's preferences, etc. In step 266, the CPU obtains user interface components from the interface component memory 28-i on the basis of the application setting information. Then the CPU sends the obtained parts to the logged-in client 30 in step 268, and ends the operation. The logged-in client 30 responsively generates a GUI (graphical user interface) for the user from the received user interface components.

It is noted that though the message server 20a-i have sent the obtained components to the client 30, the message server 20a-i may send locations where the components are stored.

Figure 10:
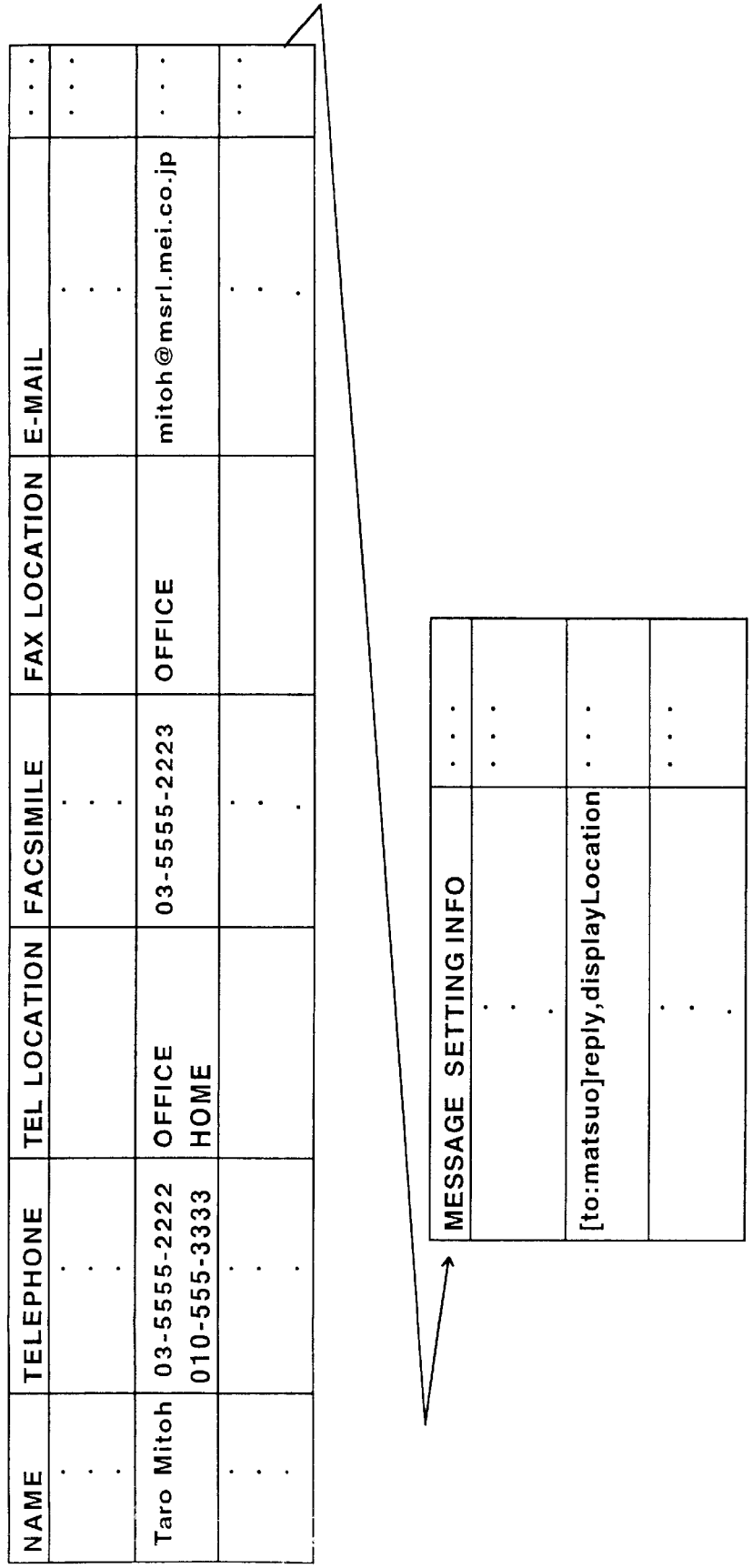
FIG. 10 is a diagram showing an exemplary record of a registered user "Mitoh"

Also, according to the principles of the invention, a message setting information can be automatically attached to a message by a sender including a predetermined script or a command in the message. For example it is assumed that a sender called "Mitoh" desires a recipient called "Matsuo" to return a response to any of the terminals Mitoh has and also desires to display his own location on the Matsuo's display. In this case, the sender has to fill in a MESSAGE SETTING field (as well as the TELEPHONE, FACSIMILE and E-MAIL fields) with a message setting script "[to:matsuo]reply,displayLocation" as shown in FIG. 10 in advance. Further, the sender Mitoh (at the client 30-1·1 for example) sets a reply requesting command in sending a message.

In response to the reply requesting command, the message server 20-1 serving the client 30-1·1 attaches a reply request to the message in transferring the message. If the server 20-i managing an e-mail account of the recipient Matsuo receives the message and the attached reply request and if the server 20-i further receives a message reception instruction from the client 30-i·j being operated by Matsuo, then the server 20-i reads the contents of the MESSAGE SETTING INF. field of the record of the sender Mitoh, i.e., the message setting script "[to:matsuo]reply,displayLocation". On the basis of the message setting information, the server 20-i further reads all the contents of the TELEPHONE, FACSIMILE and E-MAIL fields because "reply" of the message setting information means that a reply may be made to any of the terminals. The server 20-i displays a message reception frame as shown in FIG. 11.

In the just above paragraph, the destination server 20-i has obtained the message setting script and the terminal information from the address data table 120. However, such information may be sent from the sending server 20-1 to the destination server 20-i. Specifically, if the message server 20-1 or mail processor 22-1detects the reply requesting command being attached to the mail message, then the message server 20-1 responsively attaches the contents of the MESSAGE SETTING fields (i.e., [to:matsuo]reply, displayLocation) and all the contents of a TELEPHONE, FACSIMILE and E-MAIL fields to the mail message. Then, the destination server 20-i can display the message reception frame of FIG. 11 by using the received message setting script and terminal information.

Figure 11:
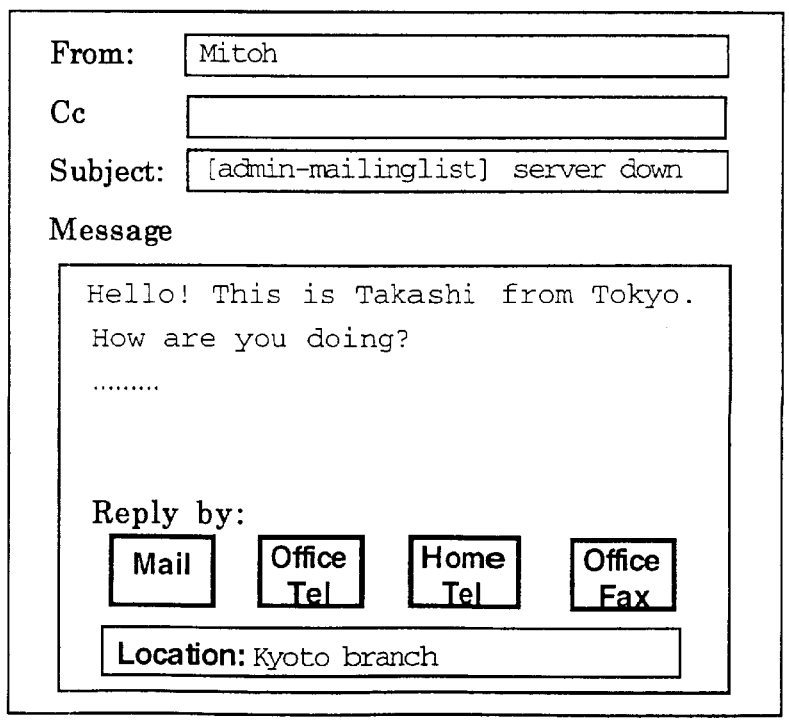
FIG. 11 is a diagram showing an example of a user interface generated by using message setting information.

In FIG. 11, there are shown four buttons indicative of terminals to which Matsuo can send a response. The four buttons are labeled "Mail", "Office Tel", "Home Tel" and "Office Fax", which correspond to the contents of the TEL LOCATION and FAX LOCATION fields of the record of the sender as shown in FIG. 10. As described above, the software components for the four buttons are obtained from the interface component memory 28-i. It is also noted that if the sending server 20-1 sends a user interface component to the destination server 20-i, then the server 20-i can display the received component on the client 30-i·j display.

When the message reception frame is displayed, pressing the Mail button causes the frame to change to a reply entry frame thereby to enable a reply by e-mail; pressing the Fax button causes a reply data to be sent as facsimile data; and pressing a Tel button causes a Matsuo's telephone terminal to be connected through a PBX (private branch exchange) to a Mitoh's telephone terminal thereby to enable a conversation through telephone.

In the above embodiment, a (sent-)message setting script is stored in a sender's record by a sender. Alternatively, a recipient may store a received-message setting script such as "[from:mitoh]reply, displayLocation" in, for example, a received-message setting information field (not shown) of his or her record of the address data table 120 in the address data base 12 or in a memory (not shown) of a message server 20-i managing an e-mail account of the recipient. However, in this case, the recipient Matsuo has to store terminal information of the sender Mitoh together with the received-message setting script.

Though the user interface generator 26-i and the interface component memory 28-i are stored in the message server 20-i, the user interface generator 26-i and/or the interface component memory 28-i may be stored in the clients 30-i·1, 30-i·1, . . . . Doing this reduces the load of the network, enabling a reduction of delays in user interface response which are caused by delays in network transmission.

The above embodiment has been described in connection with a GUI, the principles of the invention can be also applied to such user interfaces as relate to speeches, sounds, images, etc. For example, the present invention can provide a variety of user interfaces for prompting a user input when no input operation has been performed for a predetermined period of time in an input waiting state, including ones for display a text to the effect, for informing the user in voice, for prompting an input by using an image, and for informing the user by using an external device.

If information on preferences, habits, abilities and/or handicaps of the user are stored in the address data base 12, the server 20 can automatically recommend a suitable user interface to the user.

Also, the user can obtain information on map data and the present position by combining the present invention and a GPS system and including position information in the above-mentioned application setting information.

Many widely different embodiments of the present invention may be constructed without departing from the spirit and scope of the present invention. It should be understood that the present invention is not limited to the specific embodiments described in the specification, except as defined in the appended claims.

What is claimed is:

1. A message transfer service system for providing users with improved message transfer services, comprising:

a directory server for managing an address record for each of the users of the message transfer service system;

at least one message server for providing the user with said improved message transfer services, each of said at least one message server comprising:

means for using address data given as an electronic mail (e-mail) address by a sending user to obtain an address record of a recipient from said directory server, said address data including a recipient identifying part and a server address part;

means for obtaining a mail address associated with said address data from said obtained address record, said means for obtaining a mail address including:

selecting means, responsive to a determination that said address record of said recipient contains a plurality of addresses, for selecting as said mail address one of said addresses which is of a highest priority based on destination specifying information registered in the address record by the recipient or the sender; and means for transferring a message given with said address data by said sender to said obtained mail address.

2. A message transfer service system as defined in claim 1, wherein each address record of said directory server further contains attributes of a user interface for a user of said each address record, wherein said message server further comprises:

means for storing user interface components; and means for generating a user interface for said each user by using necessary user interface components in response to said attributes.

3. A message transfer service system as defined in claim 1, wherein said address record of said recipient comprises a reception script registered by said recipient in said address record of said recipient, said selecting means implementing said script.

4. A message transfer service system as defined in in claim 1, wherein said destination specifying information comprises a script written by said sender, said selecting means implementing said script.

5. A message transfer service system as defined in claim 1, further comprising sorting means, responsive to a determination that said address record of said recipient contains a plurality of addresses, for sorting said addresses in order of priority on the basis of said destination specifying information.

6. A message server for use in a message transfer service system and for providing users with improved message transfer services, wherein the message server is connected with a data base for managing an address record for each of the users of the message transfer service system, the server comprising:

means for using address data given as an electronic mail (e-mail) address by a sending user to obtain an address record of a recipient from said directory server, said address data including a recipient identifying part and a server address part;

means for obtaining a mail address associated with said address data from said obtained address record, said means for obtaining a mail address including:

selecting means, responsive to a determination that said address record of said recipient contains a plurality of addresses, for selecting as said mail address one of said addresses which is of a highest priority based on the destination specifying information registered in the address record by the recipient or the sender and means for transferring a message given with said address data by said sender to said obtained mail address.

7. A message server as defined in claim 6, further comprising means for executing a script given with said message.

8. A message server as defined in claim 6, wherein said selecting means further uses external information for said selection.

9. A message server as defined in claim 6, further comprising means responsive to a kind of a terminal identified by said obtained mail address for, if necessary, converting a format of said message according to said kind of said terminal.

10. A message server as defined in claim 6, wherein said destination specifying information comprises a script written by said sender, said selecting means implementing said script.

11. A message server as defined in claim 6, further comprising sorting means, responsive to a determination that said address record of said reciption contains a plurality of addresses, for sorting said addresses in order of priority on the basis of said destination specifying information.

* * * * *

UNITED STATES PATENT AND TRADEMARK OFFICE
CERTIFICATE OF CORRECTION

| | | |
|---|---|---|
| PATENT NO. | : 6,374,246 B1 | |
| APPLICATION NO. | : 09/141302 | |
| DATED | : April 16, 2002 | |
| INVENTOR(S) | : Takashi Matsuo | |

It is certified that error appears in the above-identified patent and that said Letters Patent is hereby corrected as shown below:

Column 9, line 46:
"mail (e-mail) address by a sending user to obtain an"
should read -
--mail (e-mail) address by a sending user (hereinafter referred to as "sender") to obtain an--

Column 9, line 59:
"ent or the sender; and"
should read -
--ent or specified by the sender; and--

Column 10, line 29:
"(e-mail) address by a sending user to obtain an address"
should read -
--(e-mail) address by a sending user (hereinafter referred to as "sender") to obtain an address--

Column 10, line 42:
"the address record by the recipient or the sender and"
should read -
--the address record by the recipient or specified by the sender and--

UNITED STATES PATENT AND TRADEMARK OFFICE
CERTIFICATE OF CORRECTION

PATENT NO. : 6,374,246 B1
APPLICATION NO. : 09/141302
DATED : April 16, 2002
INVENTOR(S) : Takashi Matsuo It is certified that error appears in the above-identified patent and that said Letters Patent is hereby corrected as shown below:

Column 10, line 63:
"that said address record of said reciption contains a plurality"
should read -
--that said address record of said recipient contains a plurality--

Signed and Sealed this

Twenty-first Day of October, 2008

JON W. DUDAS
*Director of the United States Patent and Trademark Office*